Oct. 29, 1935.  A. H. BATES  2,019,287
CYLINDER GAUGE
Filed Jan. 8, 1934
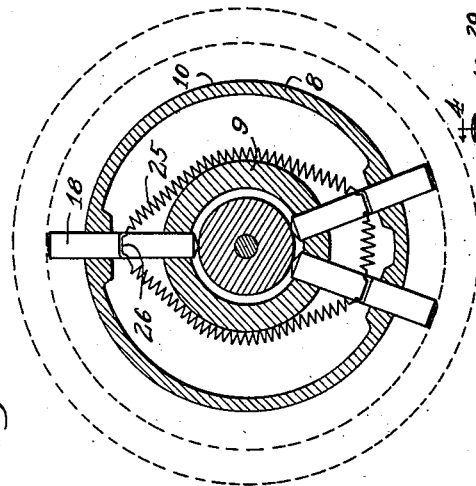
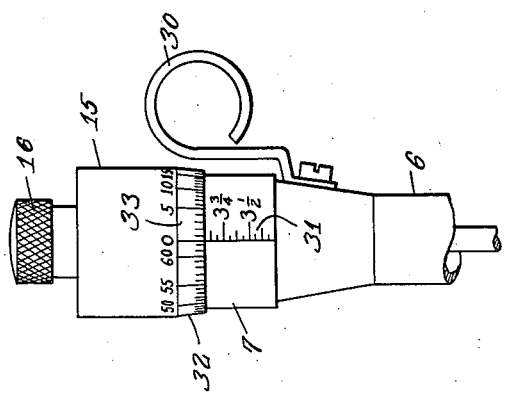
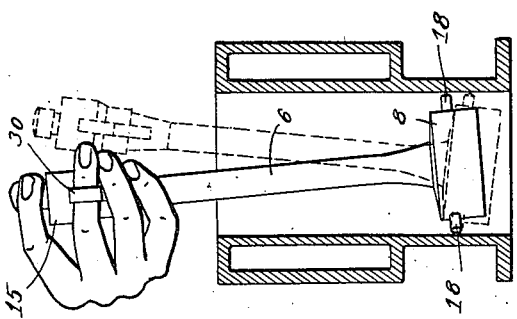
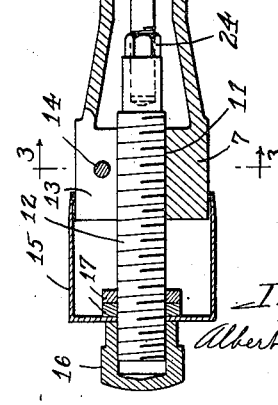
Inventor
Albert H. Bates
By
Wilson, Dowell, McCanna & Wintercorn
Attys.

UNITED STATES PATENT OFFICE 2,019,287

CYLINDER GAUGE

Albert H. Bates, Rockford, Ill., assignor to Burd Piston Ring Company, Rockford, Ill., a corporation of Illinois Application January 8, 1934, Serial No. 705,722

10 Claims. (Cl. 33—178)

This invention relates to a micrometer cylinder gauge especially designed and adapted for use in determining the size of engine cylinder bores, and also whether they are out-of-round, when the pistons therefor are to be refitted with rings.

The principal object of my invention is to provide a gauge so designed that it may be inserted in the bore and manipulated by one hand to speedily check the bore for size and shape. Other gauges that have come to my attention, provided for this purpose, have invariably been of such construction that single-handed operation in the convenient manner herein contemplated was impossible, and the operation was too awkward and gave rise to too much chance for error in measurements.

The gauge of my invention also embodies other features with a view to getting closer accuracy without sacrificing economy and durability of construction. Many gauges, while constructed to obtain the desired accuracy, were not suitable for use around garages and repair shops because rough usage would easily throw them out of adjustment or make them no longer reliable. Then too, many gauges provided for this kind of work were not designed, like the present gauge, to permit a relatively unskilled workman to make accurate measurements.

The invention is illustrated in the accompanying drawing, in which—

Figure 1 is a longitudinal section through a gauge made in accordance with my invention;

Fig. 2 is a side view of the upper or handle end of the gauge;

Figs. 3 and 4 are cross-sections on the correspondingly numbered lines of Figure 1, and Fig. 5 is an engine cylinder bore showing the gauge entered therein and indicating how the same is adapted to be manipulated by one hand in the measurement of the bore.

The same reference numerals are applied to corresponding parts throughout the views.

The gauge comprises an elongated cylindrical barrel 6 slightly enlarged at the ends to form a small solid cylindrical hub 7 at the upper end, and a relatively large hollow cylindrical hub 8 at the lower end, having inner and outer concentric walls 9 and 10. The hub 7 has a center hole 11 accurately bored coaxial with the barrel 6 and hub 8 and accurately threaded to receive a screw 12 with minimum play. The hub 7 is slotted lengthwise radially, as at 13, and a screw 14 is threaded in the hub so as to contract the hub a trifle through the slight closing of slot 13 when the screw 12 shows evidence of wear, in order that the screw 12 may again be operated with the degree of accuracy required for close measurement. A thimble 15 firmly clamped on the screw 12 between the knob 16 and nuts 17 fits over the hub 7, concealing the screw 14 except when the screw 12 is turned nearly to a limit position, so far as expanding the fingers or plungers 18 is concerned. The fingers 18 slide in radially aligned holes 19 and 20 in the inner and outer walls 9 and 10 of the hub 8. There are three of these fingers, two of them about 30° apart and the other diametrically opposite and on a line bisecting the 30° angle. This relationship of the fingers is very important in the manipulation of the gauge, as will be pointed out presently. The outer ends of the fingers are rounded to make point contact with the cylinder wall, and the inner ends are cone shaped to make line contact on a conical head 21 that has a cylindrical portion slidable with a close working fit in the axial bore 22 in the hub 8. The head 21 not only slides but turns in the bore, it being rigidly connected by rod 23 with the screw 12. One end of the rod is riveted in the head 21 and the other end is threaded in the inner end of the screw 12 and locked thereto with a jamb nut 24. Oil specified for the purpose may be dropped onto the conical head 21 through the small oiler, shown in Figure 1, next to the hub 8 to lubricate the conical surface for easy working thereon of the fingers 18 and to lubricate the bore 22 so that the head will slide and turn therein freely. A coiled tension spring 25, preferably in one length, is stretched from finger to finger around the inner wall 9 of the hub 8, and has straightened portions entered in slots 26 cut into the sides of the fingers at the middle thereof. The slots 26 at their inner ends are tangential with respect to diametrical holes 27 drilled through the pins, whereby to afford a sort of bayonet slot to hold the spring securely against accidental disengagement from the pins. The spring, of course, being under some tension, always keeps the fingers 18 in engagement with the conical surface of the head 21, and if the head 21 is moved downwardly in the bore 22, the fingers 18 respond to the spring tension and move inwardly to a proportionate extent. A plate 28 is pressed into a counterbore 29 in the bottom of the hub 8 so as to protect the working parts against tampering and against dust and dirt.

The gauge is light enough so that one can support it by one finger while manipulating the knob 16 to turn the screw 12. For this purpose, I have provided the small handle 30 projecting from the side of the hub 7, as best shown in Figs. 2 and 5. A scale 31 graduated into sixteenths of an inch is provided on the hub 7, and the thimble 15 has a tapered lower portion 32 on which another scale 33 is provided graduated into thousandths of an inch. Now, the screw 12 has sixteen threads to the inch and, therefore, in each turn, advances the thimble 15 one-sixteenth of an inch, which accounts for the fact that there are sixty-two and a fraction graduations appearing on the scale 33, so that any fraction of a turn can be read directly in thousandths of an inch. The purpose of this is to facilitate the matter of determining what sized piston ring is required for a given cylinder. Piston rings are sold in sixteenth inch size variations, and in over-sizes, thusly: $3\tfrac{1}{16}''$ standard, $3\tfrac{1}{16}''$ plus .005'', $3\tfrac{1}{16}''$ plus .010'', and $3\tfrac{1}{16}''$ plus .020'', etc.

Obviously, therefore, the thing that the mechanic is interested in knowing when he is measuring a worn cylinder bore is how many thousandths over-size should be specified for the piston ring size, and he can determine that quite easily using this gauge.

In operation, the mechanic supports the gauge by means of the handle 30 with his middle finger inserted, as shown in Fig. 5, and lowers the gauge into the cylinder bore with the barrel 6 at a slight angle to the axis of the bore, resting the lower end 8 on the two closely spaced fingers 18. Then, assuming that he has previously adjusted the gauge to within a few thousandths of the estimated size of the bore, he will first oscillate the gauge, as indicated in dotted lines, to determine whether the third finger 18 still has clearance with respect to the wall of the cylinder, and, if it does, he brings the gauge back to its tilted position and turns the knob 16 slightly in a counterclockwise direction to expand the fingers 18 slightly, and makes another trial by oscillation of the gauge to determine whether the third finger touches the cylinder wall. When the gauge has been adjusted so that the third finger will engage the cylinder wall lightly enough to allow the gauge to be oscillated back and forth over dead-center, the reading at 31—33 gives the correct diameter down to a thousandth of an inch. The mechanic ordinarily takes readings in line with the crank pin and also at right angles, the latter reading being usually slightly larger than the former in a worn cylinder bore. The extent of the difference, that is, the out-of-roundness, may be sufficient to make it advisable to have the cylinder re-bored, inasmuch as new piston rings would not do much good if the bore is worn out-of-round too far. The mechanic using this gauge is, therefore, better equipped to advise the customer on the question of whether it is only necessary to put in new rings or whether the condition of the engine is such that re-boring is advisable. The gauge will, of course, come in handy also in the measurement of a re-bored cylinder to determine the exact size of rings to use.

If the gauge requires cleaning or replacement of worn or broken parts, the cover plate 28 on the bottom of the gauge can be forced out by means of the head 21 to make the working parts at that end accessible. The plate can be replaced easily after the cleaning or repairing, and then the gauge can be reset by simply adjusting the parts 16—17 with the fingers 18 engaged inside a test ring, as indicated in dotted lines in Fig. 4, having an accurately bored inside diameter, stamped on the ring. Such rings may be furnished with the gauge as sold, or may be obtained from the manufacturer. The ring will, of course, also come in handy to check the accuracy of the gauge from time to time.

It is believed the foregoing description conveys a good understanding of the objects and advantages of the invention. The appended claims have been drawn with a view to covering all legitimate modifications and adaptations.

I claim:

1. An adjustable internal gauge comprising an elongated barrel having a threaded axial hole provided therein at one end and a coaxial bore provided therein at the other end, a rod extending lengthwise in said barrel having a screw at one end threaded in said hole and projecting from the end of the barrel, a conical head on the other end of the rod slidable and rotatable in the bore, the threaded end of said barrel having a cylindrical hub formed thereon provided with a scale on the side thereof, a thimble fixed on the projecting end of said screw and telescoping on said hub and having cooperating scale marking thereon, the other end of said barrel having an enlarged cylindrical hub portion formed thereon concentric with the bore, a plurality of fingers slidable radially in said hub and contacting the conical surface of the head at their inner ends, said last-mentioned cylindrical hub being hollow and comprising inner and outer walls in spaced concentric relation, the bore being within the inner wall and the fingers being slidable in registering radial holes in the inner and outer walls, and tension spring means housed in the space between the inner and outer walls and interconnecting the fingers, tending normally to urge the fingers inwardly toward engagement with the conical head.

2. An adjustable internal gauge comprising, in combination, a rotatable rod, a conical head on one end of said rod having the large end formed cylindrical, a screw on the other end of said rod, a casing surrounding said rod having a threaded hole provided therein at one end threadedly receiving the screw, a hollow cylindrical hub on the other end of said casing formed to provide inner and outer walls in spaced concentric relation, the inside of the inner wall providing a smooth cylindrical bore coaxial with the aforesaid threaded hole and receiving the cylindrical portion of the conical head with a close working fit, and a plurality of measuring fingers slidable in registering holes provided in the inner and outer walls of said hub and disposed with their inner ends in slidable engagement with the conical surface of said head.

3. A gauge as set forth in claim 2 including tension spring means housed between the inner and outer walls of the hub and connected with said fingers to urge the same normally inwardly toward the head.

4. A gauge as set forth in claim 2 including a single tension spring housed between the inner and outer walls of said hub and interconnecting said fingers so as to urge the same inwardly.

5. A gauge as set forth in claim 2 including tension spring means housed between the inner and outer walls of said hub and interconnecting said fingers so as to urge the same inwardly, and a cover plate removably engaged on the outer wall to close both the space between the inner and outer walls and the bore in the inner wall.

6. A gauge as set forth in claim 2 including a single continuous coiled tension spring passed around the inner wall from finger to finger to interconnect the same and urge them normally inwardly toward the head, said spring having straight intermediate portions received in transverse slots provided in the sides of said fingers.

7. An adjustable internal gauge comprising an elongated casing, a rod extending lengthwise through said casing and having a conical part movable endwise relative to one end thereof, a hollow cylindrical hub on the latter end of said casing in substantially concentric relation to and surrounding said conical part and formed to provide inner and outer walls in spaced substantially concentric relation, a plurality of measuring fingers slidable in registering holes provided in said inner and outer walls, and tension spring means extending from finger to finger between said inner and outer walls to urge the fingers inwardly into engagement with the conical part.

8. A gauge as set forth in claim 7 including a cover plate removably engaged on the outer wall of said cylindrical hub whereby to conceal the tension spring means between the inner and outer walls and also conceal the centrally disposed conical part.

9. A gauge as set forth in claim 7 including a cover plate frictionally engaged on the outer wall of said cylindrical hub whereby to conceal the tension spring means between the inner and outer walls and also conceal the centrally disposed conical part, said rod being movable with respect to said casing to an extreme position to engage the plate from the inside and forcibly displace the same whereby to afford access to the inside of said cylindrical hub.

10. A gauge as set forth in claim 7 wherein the tension spring means comprises a single continuous coiled tension spring passed around the inner wall of said hub from finger to finger and having straight intermediate portions removably received in transverse slots provided in the sides of said fingers.

ALBERT H. BATES.